United States Patent [19]
Preble

[11] Patent Number: 5,886,301
[45] Date of Patent: Mar. 23, 1999

[54] METHOD AND DEVICE FOR MEASURING WEIGHT

[75] Inventor: Duane Preble, Chantilly, Va.

[73] Assignee: Vitel, Inc., Chantilly, Va.

[21] Appl. No.: 905,449

[22] Filed: Aug. 4, 1997

[51] Int. Cl.$^6$ .............................. G01G 9/00; G01G 5/04; G01G 3/14; G01G 1/38
[52] U.S. Cl. .......................... 177/1; 177/210 C; 177/212; 177/208
[58] Field of Search ........................... 177/210 R, 210 C, 177/212, 254, 208, 209, 141, 1

[56] References Cited

U.S. PATENT DOCUMENTS

| | | | |
|---|---|---|---|
| 3,372,764 | 3/1968 | Crotts | 177/208 |
| 3,672,456 | 6/1972 | Hester | 177/1 |
| 3,672,457 | 6/1972 | Hester | 177/1 |
| 3,874,229 | 4/1975 | Ormond | 177/254 |
| 4,184,555 | 1/1980 | Maltby et al. | 177/208 |
| 4,266,263 | 5/1981 | Haberl et al. | 177/210 C |
| 4,651,838 | 3/1987 | Hamilton et al. | 177/209 |
| 4,917,198 | 4/1990 | Sing | 177/208 |
| 5,092,415 | 3/1992 | Asano | 177/1 |

*Primary Examiner*—Randy W. Gibson
*Attorney, Agent, or Firm*—J. W. Gipple; Gipple & Hale

[57] ABSTRACT

A device and method are described for measuring the weight of objects using a pneumatically sealed bellows which contains a pair of spaced apart capacitor plates. In accordance with the invention, the pneumatic pressure within the bellows is varied to maintain constant dimensions for the bellows and a constant distance between the electric capacitor plates. This pressure is therefore a function of the weight placed upon the bellows which exerts a pressure tending to force the walls of the bellows and the capacitor plates closer together thereby changing the electric capacitance between the capacitor plates. By adjusting the pneumatic pressure to maintain a constant electric capacitance and constant dimensions for the bellows, a convenient parameter is obtained from which the weight of objects placed on the bellows can be measured. The invention has particular application in the meteorological sciences.

7 Claims, 2 Drawing Sheets

METHOD AND DEVICE FOR MEASURING WEIGHT

SUMMARY OF THE INVENTION

The present invention is directed to a device and method for measuring the weight of objects placed upon it. More particularly the present invention is directed to an improved device and method employing both electric capacitance measurement and pneumatic pressure control to achieve greater accuracy in determining the weight of objects. The present invention has particular application in the meteorology sciences such as determining the extent of snow and rain fall.

BACKGROUND OF THE INVENTION

It is well known to employ changes in the dielectric constant between two capacitor plates as means for weighing various objects. U.S. Pat. No. 4,520,885 to Jeffrey, for example, describes a load sensing mat comprising a pair of superimposed spaced, conductive elements held together by resilient material so that the elements constitute capacitance plates which produce electric signal changes according to the load placed on it to compress the resilient material and thus vary the spacing between the capacitance plates.

U.S. Pat. No. 4,366,876 to Chen describes an hydraulic bellows type scale which has a plurality of hydraulic bellows, a variable capacitor and an integrated circuit and display unit. The weight of an object placed on the scale is transmitted by means of pressure exerted on the hydraulic bellows to the capacitor which produces a capacitance signal which reflects the weight of the object. U.S. Pat. No. 4,581,677 to Hruby et al. describes a layered capacitive sensor for detecting loads and load variations. The device comprises two outer protective layers, a first electrical conductor layer, a first electrically insulating layer, a second electrically conductive layer, a second electrically insulating layer and a third electrically conductive layer. The insulating layers are made of a resilient material to permit compression of the multilayered mat thereby producing a change in electric capacitance.

These devices of the prior art have, however, required that the distance between capacitor plates vary in relation to weight placed upon the plates thereby inducing a change in the capacitance, the change which is measured as an electric signal. Such systems have been found, however, to posses certain characteristics which result in their being inherently inaccurate and unreliable. Particularly where compressible materials are employed between capacitor plates, a large hysterisis effect is encountered in which the relative geometry of the capacitor does not remain constant for a given load. This effect results in inconsistent and unreliable readings since the critical distance between the plates cannot be maintained for a constant load.

Further, where a weight sensitive mat is being employed to measure snow cover, it is important that the thickness of the mat remain constant under variations in snow load temperature and barometric pressure changes. If the mat compresses and enlarges, the snow load itself is compressed and more prone to bridging and or fill in by more snow thereby giving an erroneous snow cover measurement.

Accordingly, it would be advantageous to provide a new and improved scale and methodology for weighing objects using capacitor plates in which the distance between the capacitor plates and the thickness of the mat containing the plates can be maintained constant irrespective the objects placed upon it.

It is a further object of the present invention to provide a weighing system for determining the weight of objects which employs a pneumatic bellows controlled by change in dielectric constant between capacitor plates to maintain a constant distance between capacitor plates irrespective of the weight placed upon the system.

Yet a further object of the present invention is to provide a pressure sensitive system which is inexpensive, versatile, and can be employed in a number of applications including the measurement of snow water content, rain water collection, and the depth of large bodies of water into which the device can be submerged.

DETAILED DESCRIPTION OF THE INVENTION

In accordance with the present invention, an improved scale and methodology are provided for measuring the weight of objects placed on the device, which device achieves the aforementioned and other objectives. The device of the invention essentially comprises a pneumatically sealed bellows having a pair of parallel, flat, spaced apart surfaces which define the upper and lower walls of the bellows and a pair of planar, spaced apart capacitor plates within the bellows.

In accordance with the present invention, loads placed atop the bellows will exert a downward pressure depending upon the weight of the load and this pressure will tend to decrease the distance between the upper and lower walls of the bellows as well as the capacitor plates within the bellows. In accordance with the invention, however, the pneumatic pressure within the bellows is adjusted in response to variations in distance between the capacitor plates and therefore the electric capacitance of the capacitor plates so that a constant distance between the capacitor plates is maintained irrespective of changes in load weight. Similarly the dimensions of the bellows itself are also maintained constant by means of adjustment in the pneumatic pressure within the bellows. It will be apparent that greater loads placed upon the bellows will exert a greater downward force against the uppermost of the capacitor plates thereby tending to diminish the distance between the upper and lower capacitor plates and change the dielectric constant between these plates since the medium between the plates (which is usually dry air) remains the same. The variation in the electric signal thereby produced automatically causes the pneumatic pressure within the bellows to be increased to thereby restore the original distance between the capacitor plates and between the upper and lower walls of the bellows. Thus, sufficient air pressure is applied to the bellows so that the capacitance is held constant along with the dimensions of the bellows and the spacing between the capacitor plates is fixed for various loads. Since the dimensions of the bellows are known and the air pressure can be accurately measured, the total load of applied to the bellows can thereby also be determined with great accuracy. This can be described as a feedback loop where the capacitance is held at a fixed "null" valve by the application of pneumatic pressure.

The invention including its structure, function and use will, however, be more fully appreciated by having reference to the drawings which illustrate preferred embodiments thereof.

Figure 1:
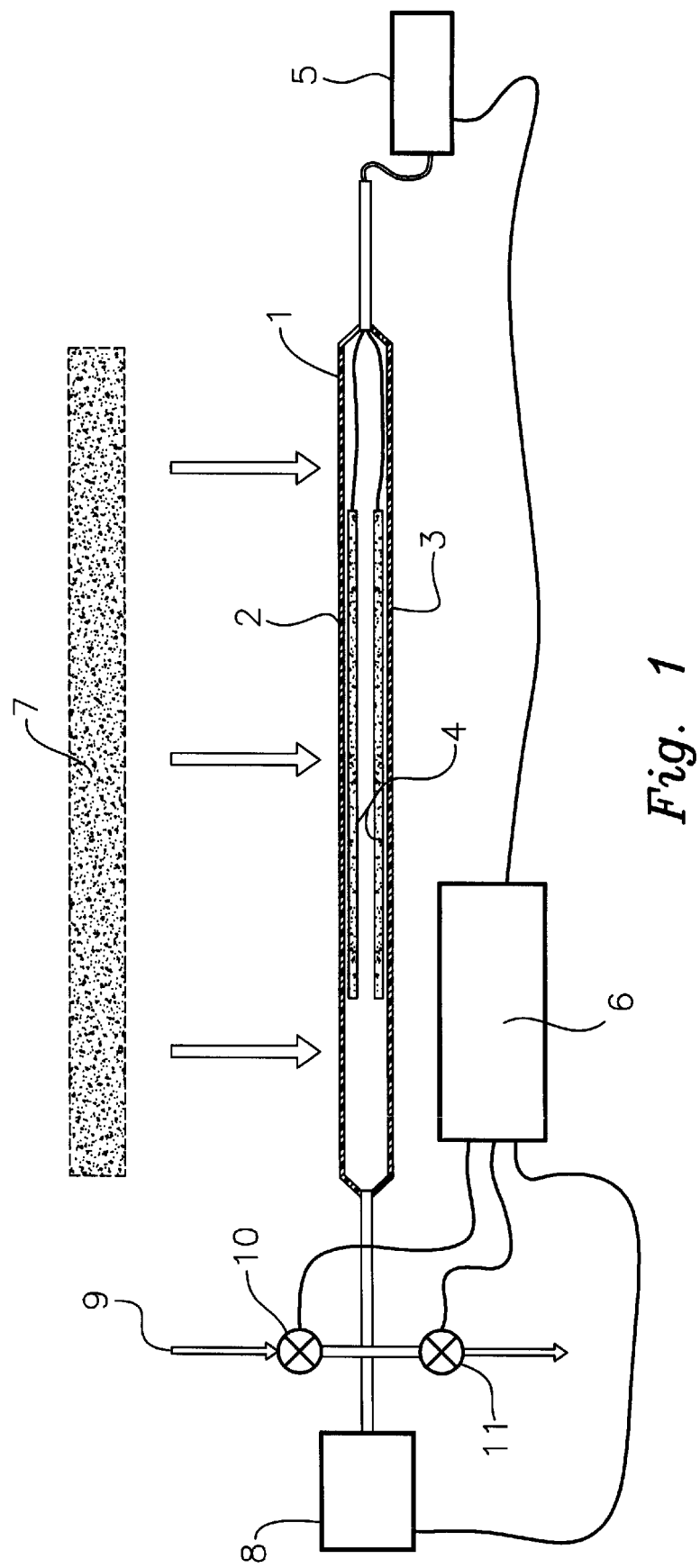
FIG. 1 is a schematic drawing illustrating a basic structure of the present invention.

Directing attention to FIG. 1 of the drawings, a resilient bellows 1 is shown having an upper surface 2 and a lower surface 3. Disposed within the bellows in spaced parallel relationship to one another and to the respective upper and lower surfaces of the bellows are capacitor plates 4. These capacitor plates are electrically connected to capacitance meter 5 which measures changes in the dielectric constant between the plates 4. The capacitance meter 5 is in turn electrically connected to controller 6 which responds to changes in the measured electrical capacitance between the plates 4 and from pressure transducer 8 to produce controlled signals which are sent, air exhaust valve 11 and pressurized air source 10. In response to the signals received from the controller 6, air valves 10 and 11 will respectively be opened or closed to increases or diminish the pressure of air admitted to the bellows 1. Air pressure changes are also communicated by means of pressure transducer 8 to controller 6. In operation, a load 7, which may be snow, water or other material is placed or received upon the upper surface 2 of the bellows to thereby exert downward pressure on the bellows and upper capacitor plate 4. The change in dielectric constant between the plates 4 caused by the change in spacing between the plates and resulting from compression of the bellows is communicated through the capacitance meter to the controller and the air pressure valve controls so that the air pressure within the bellows is increased incrementally to maintain the original spacing between the upper and lower walls of the bellows and the capacitor plates. This change in pressure is registered on the pressure transducer 8 and will be fixed for a given load 7. Thus, once the device has been calibrated, the weight of load 7 placed upon the bellows is immediately and accurately determined from the pressure change registered by pressure transducer 8.

Figure 2:
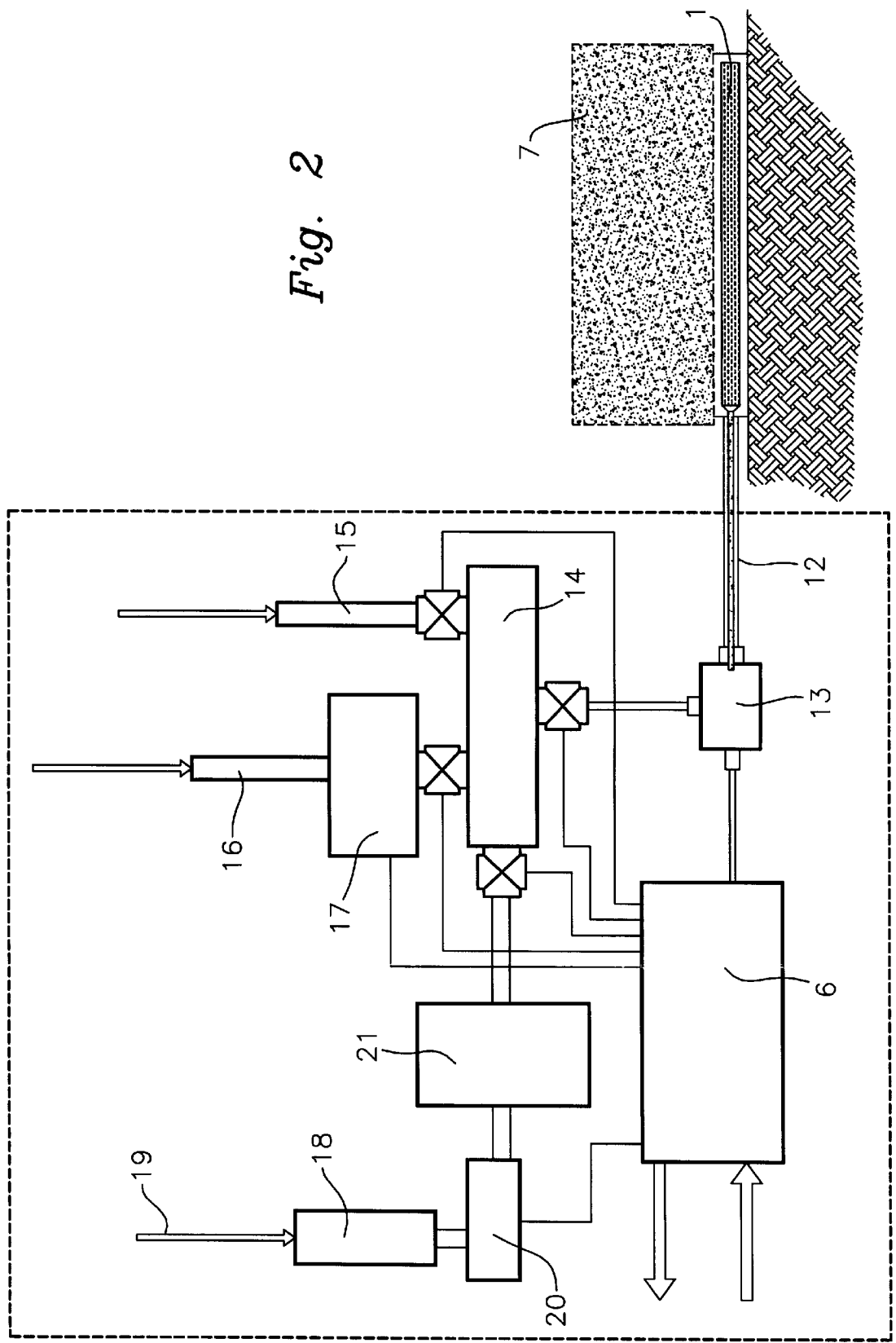
FIG. 2 is a detailed schematic drawing illustrating a preferred embodiment of the present invention used to determine the weight of a snow load.

FIG. 2 of the drawings provides a more detailed schematic illustration of a preferred embodiment of the invention employed to determine the weight of a snow load which has accumulated on the bellows 1. The pneumatically sealed bellows is constructed of rubber or other synthetic material and inflated to result in distance between the upper and lower surfaces of about 0.25 inches. Electrically conductive rubber or similar material is layered on the inside of each of the two opposing upper and lower surfaces of the bellows to form the electric capacitors. Since both an air tube and a pair of wires is required to enter the otherwise pneumatically sealed bellows, a break out box 13, which is a sealed box having packing glands, is employed and connected by means of tube 12 to the bellows 1. Controller 6 is a microprocessor which is programmed to cyclically or on demand measure the pressure required to maintain the bellows at a constant predetermined capacitance which may, for example, be about 1650 picoFarads. An analog circuit converts the capacitance signals received from the bellows to an equivalent voltage which in turn in measured by an analog/digital convertor present in the microprocessor. The value of this voltage is compared with an initial value achieved during calibration and the microprocessor then admits more air or releases it from the bellows to adjust the capacitance to its original value. This adjustment is accomplished by controlling the electric pneumatic valves attached to manifold 14. As illustrated in FIG. 2 of the drawings, a pair of atmospheric vents are attached to manifold 14 for discharging air from the bellows. Pressure sensor 17 determines the pressure of air exiting the system through vent 16 and communicates this pressure to controller 6. Additional air is added to the system through air intake 19 which passes through a desiccant chamber 18 to air pump 20 which provides dry air under pressure to PVC tank 21 where it can be introduced on command of the controller into the manifold system 14 and the bellows 1.

Once a capacitance is established, the pressure sensor is switched so that the pneumatic valve is opened and the sensor voltage measured. Separate routines are used to zero and calibrate the pressure transducer for each measurement. Zero calibration point is made by venting or opening the pressure transducer input to the atmosphere. Scale calibration points can be made using bellows with known weights.

As previously noted, the bellows of the present invention may be formed from flexible material such as butyl rubber, hypalon or other very stable insulating material. On the inner surface of each side of the bellows conductive material can be bonded. The conductive material may be, for example, metalized mylar or conductive rubber. The two conductive sheets form a capacitor whose value is proportional to the spacing and dielectric constant of the medium (in this case air) between the capacitor sheets. In some instances, it may be desirable to use a soft porous polyurethane foam between the capacitor sheets to prevent shorts especially if there are any pointed loads that might otherwise short the capacitator plates.

Although the present invention will understood to have a number applications in which the weight of objects or pressure applied to the bellows is to be determined, three particular applications are especially noted.

In the measure of snow cover illustrated in FIG. 2, it is important that the thickness of the bellows remain constant under variations in snow load, temperature and barometric pressure changes. If the mat were to compress and enlarge then the snow load would be compressed and more prone to bridging and/or fill in by more snow giving an erroneous snow cover measurement. Also, through use of various control methods, zero and scale reading may be obtained from the pressure sensor. These independent pressure measurements may be used to eliminate drifts in the sensor offset and scale factors. A one percent sensor may be improved to 0.05 or better accuracy and total snow water measurement accuracy can be expected to be about 0.25 percent.

The present invention can also be used to determine the weight of total precipitation including liquid water by employing a catch bucket placed of over a suitably sized bellows.

Finally, water levels, for example, in relatively deep bodies of water can be measured using the device of the present invention if a small bellows in the order of 2'×3" is placed in a porous submerged enclosure. This technique is a substitute for the bubbling method currently employed in this technology. Advantages of the system of the invention are that the transducer is not submerged so that only an inexpensive bellows is lost if removed by flood or other disaster; a very small amount of gas is used compared to an open bubbler tube; excellent accuracy with modest cost is obtained and a water level measurement may be achieved at a considerable distance from the controller.

A particularly aspect of the system of the invention is the integrated use of the capacitive measurement to maintain a constant bellows dimension using a counter balancing pneumatic force which may be easily controlled at distance. Multiple units may use the same controller and sensor system thereby providing very economical systems that have many sensor points. Maintaining a constant bellows dimension is important for several reasons: typical bellows characteristics such as spring constant and hysteresis are largely eliminated. For example, in the snow load case, the capacitance is controlled to within one pF of a total of 250 pF yielding a constant dimension of the ¼" gap of the 0.0001". Further, where the device of the invention is used as snow load sensor, characteristics of the material above the bellows may be changed by changing dimensions of the bellows. Also, use of pneumatic force allows auto zeroing and scale methods to be used to significantly improve accuracy with low costs sensors. It should be noted, however, that in cases where the bellows in enclosed such as where water depth is being measured, the bellows should not be allowed to press against the outer case so that the fluid load is measured and not the force against the case.

What is claimed is:

1. A scale for measuring the weight of objects comprising: a structure for receiving said objects disposed atop a pneumatically sealed bellows having a pair of parallel, flat, spaced apart surfaces defining the upper and lower walls thereof and having disposed therein a pair of planar, spaced apart capacitor plates; the upper and lower walls of said bellows and said capacitor plates being respectively vertically displaceable together in response to the weight of said objects in said receiving structure, the electric capacitance between said capacitor plates varying in relation to said vertical displacement thereof; pneumatic pressure control means being operably connected to said bellows to increase or decrease pneumatic pressure and maintain constant distance between said upper and lower bellows walls and said capacitor plates respectively in response to variations in said electric capacitance communicated by signal to said pressure control means; and a gauge for measuring said increase or decrease in said pneumatic pressure in said bellows to thereby determine the weight of said objects placed in said structure said weight being proportional to said increased or decrease.

2. The scale of claim 1 wherein said capacitor plates are each respectively the inner surface of said upper and lower bellows walls.

3. The scale of claim 2 wherein said plates are electrically conductive rubber layered on said bellows walls.

4. A scale for measuring the weight of objects comprising: a structure for receiving said objects disposed atop a pneumatically sealed bellows having a pair of parallel, flat, spaced apart surfaces defining the upper and lower walls thereof and having disposed therein a pair of planar, spaced apart capacitor plates; the upper and lower walls of said bellows and said capacitor plates being respectively vertically displaceable together in response to the weight of said objects in said receiving structure, pneumatic pressure control means being operably connected to said bellows to increase or decrease pneumatic pressure in the bellows and maintain constant distance between said upper and lower bellows walls and said capacitative plates respectively in response to variations in said electric capacitance caused by the weight of said objects in said receiving structure and communicated to said pressure control means; and a gauge for measuring said increase or decrease in said pneumatic pressure in said bellows to thereby determine the weight of said objects, said weight being proportioned to said increase or decrease.

5. The scale of claim 4 wherein said capacitor plates are each respectively the inner surface of said upper and lower bellows walls.

6. The scale of claim 5 wherein said plates are electrically conductive rubber layered on said bellows walls.

7. A method for measuring the weight of objects comprising: placing said objects atop a pneumatically sealed bellows having a pair of parallel, flat, spaced apart surfaces defining the upper and lower walls thereof and having disposed therein a pair of planar, spaced apart capacitor plates; the upper and lower walls of said bellows and said capacitor plates being respectively vertically displaceable together in response to the weight of said objects; connecting pneumatic pressure control means operably to said bellows to increase or decrease pneumatic pressure and maintain constant distance between said upper and lower bellows walls and said capacitor plates respectively in response to variations in said electric capacitance communicated by signal to said pressure control means; maintaining the distance between said capacitor plates at a constant value by varying the pneumatic pressure within said bellows in response to variations in said electric capacitance between said capacitor plates resulting from the weight of said objects communicated by signal to said pressure control means; and measuring changes in said pneumatic pressure in said bellows required to maintain said constant distance in response to variations in the weight of said objects, said changes in pneumatic pressure being indicative of the weight of said objects.

* * * * *